Patented Dec. 1, 1953

2,661,365

UNITED STATES PATENT OFFICE 2,661,365

ALKANEDIOL PHOSPHORYL MONOCHLORIDES

Harry R. Gamrath and Roger E. Hatton, St. Louis, Mo., assignors to Monsanto Chemical Company, St. Louis, Mo., a corporation of Delaware No Drawing. Application March 11, 1950, Serial No. 149,221

20 Claims. (Cl. 260—461)

This invention relates to alkanediol phosphoryl monochlorides; more specifically, this invention relates to alkanediol monochlorides having the following general formula

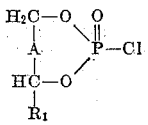

wherein A represents a divalent aliphatic organic radical having the general formula $$C_nH_{2n}$$

wherein $n$ represents a whole number from 1 to 7 inclusive and $R_1$ represents an alkyl radical containing from 1 to 6 carbon atoms. Representative of a preferred embodiment of this invention, are those alkanediol phosphoryl monochlorides having the above described general formula wherein A represents a radical having the formula

wherein R is selected from the group consisting of hydrogen and alkyl radicals containing at least 1 and not more than 6 carbon atoms. The novel alkanediol phosphoryl monochlorides which constitute a preferred embodiment of this invention, may, therefore, be represented by the formula

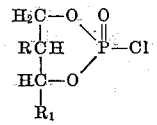

wherein R is selected from the group consisting of hydrogen and alkyl radicals containing from 1 to 6 carbon atoms and $R_1$ represents an alkyl radical containing from 1 to 6 carbon atoms.

The alkanediol phosphoryl monochlorides of this invention are valuable intermediates in the syntheses of various compounds useful as insecticides, functional fluids, synthetic lubricants, plasticizers, etc. Neutral ortho-phosphate esters, for example, are obtained by reacting the alkanediol phosphoryl monochlorides of this invention with a slight excess of an alkali metal arylate or with alcohols. These phosphate esters have exceptional utility as plasticizers, functional fluids and insecticides. Compounds having exceptional utility as oil additives may be prepared by reacting the alkanediol phosphoryl monochlorides of this invention with ammonia, amines or mercaptans such as thioalcohols or thiophenols. When the alkanediol phosphoryl monochlorides of this invention are hydrolyzed with water, alkanediol phosphoric acids are formed which find use in the textile and paper manufacturing industries.

The alkanediol phosphoryl monochlorides of this invention are mobile liquids with a pungent odor. They are essentially colorless but the colors may vary from light yellow to purple-brown, depending upon the conditions of preparation and the purity of the diol utilized.

The novel alkanediol phosphoryl monochlorides of this invention are most conveniently prepared by reacting a 1 molecular proportion of an alkanediol containing a primary and a secondary hydroxyl group and having the formula

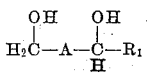

wherein A represents a divalent organic radical having the formula $$C_nH_{2n}$$

wherein $n$ is a whole number from 1 to 7 inclusive and $R_1$ is an alkyl radical containing from 1 to 6 carbon atoms, with approximately a 1 molecular proportion of phosphorus oxychloride, and removing the hydrogen chloride gas formed during the reaction. In preparing the novel alkanediol phosphoryl monochlorides which constitute a preferred embodiment of this invention, the alkanediol utilized in the above process may be represented by the formula

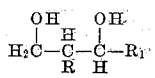

wherein R is selected from the group consisting of hydrogen and alkyl radicals containing from 1 to 6 carbon atoms, and $R_1$ is an alkyl radical containing from 1 to 6 carbon atoms.

The following examples are illustrative of the novel alkanediol phosphoryl monochlorides of this invention:

EXAMPLE I

*2-ethyl-1,3-hexanediol phosphoryl monochloride*

To a one-liter, round-bottom flask fitted with a stirrer, thermometer, dropping funnel and outlet attached to a drying tube, was charged 230.1 g. of phosphorus oxychloride. The dropping funnel was charged with 219.3 g. of 2-ethyl-1,3-hexanediol. The contents of the flask were cooled with an ice bath and then the glycol was slowly added to the phosphorus oxychloride over a two-hour period, while maintaining a reaction temperature of about 10°–15° C. After all of the glycol had been added, the ice bath was removed and the temperature of the reaction mixture allowed to rise to about 25° C. with continuous stirring. The outlet of the reaction flask was then connected to a water aspirator and hydrogen chloride gas which formed during the reaction, was removed by reducing the pressure slowly to 10–15 mm. Hg absolute and maintaining the temperature at 20°–25° C. Substantially complete removal of the hydrogen chloride was obtained in about 10 hours.

An essentially quantitative yield of 2-ethyl-1,3-hexanediol phosphoryl monochloride was obtained having the following properties:

Specific gravity 25°/25° C_____ 1.1941
Crystallizing point_____ below −20° C.
Color_____ essentially colorless

| Analysis | Chlorine, percent |
|---|---|
| Calculated for $C_8H_{16}O_3PCl$ | 15.67 |
| Found | 15.96 |

EXAMPLE II

*2-methyl-1,3-hexanediol phosphoryl monochloride*

Using the equipment and procedure set forth in Example I, 2-methyl-1,3-hexanediol phosphoryl monochloride was prepared using 66.1 g. of 2-methyl-1,3-hexanediol and 76.7 g. of phosphorus oxychloride. The yield was essentially quantitative.

EXAMPLE III

*1,3-hexanediol phosphoryl monochloride*

In accordance with the procedure set forth in Example I, 1,3-hexanediol phosphoryl monochloride was prepared in a quantitative yield, utilizing 118.2 g. of 1,3-hexanediol and 153.4 g. of phosphorus oxychloride.

EXAMPLE IV

*1,3-butanediol phosphoryl monochloride*

Utilizing the equipment described in Example I, the reactor was charged with 383.5 g. of phosphorus oxychloride. The dropping funnel was charged with 225.3 g. of 1,3-butanediol. The contents of the reaction flask were cooled with an ice bath and the 1,3-butanediol slowly added to the stirred phosphorus oxychloride over a period of 2 hours, while maintaining a reaction temperature of about 10°–15° C. After all of the 1,3-butanediol had been added, the ice bath was removed and the temperature of the reaction mixture allowed to rise to about 25° C. with continuous stirring. Hydrogen chloride gas which formed during the reaction was removed by slowly reducing the pressure on the reactor system until a pressure of about 10–15 mm. Hg absolute was reached, while maintaining the mass temperature at about 15°–25° C. Practically complete removal of the hydrogen chloride was obtained in 3½ hours. An essentially quantitative yield, 426.4 g., of 1,3-butanediol phosphoryl monochloride was obtained having the following properties:

Specific gravity at 25°/25° C_____ 1.3675
Crystallizing point_____ below −20° C.
Color_____ essentially colorless

| Analysis | Chlorine, percent |
|---|---|
| Calculated for $C_4H_8O_3PCl$ | 20.82 |
| Found | 20.94 |

EXAMPLE V

*2-methyl-1,3-butanediol phosphoryl monochloride*

In accordance with the procedure described in Example I, an essentially quantitative yield of 2-methyl-1,3-butanediol phosphoryl monochloride was obtained, utilizing as the reactants 104.1 g. of 2-methyl-1,3-butanediol and 153.4 g. of phosphorus oxychloride.

Other compounds which are included within the scope of this invention, and which may be prepared in accordance with the procedure set forth in the preceding examples, are contained in the following list, which list is to be considered as illustrative rather than limitative of the scope of this invention:

2-isopropyl-1,3-butanediol phosphoryl monochloride
2-butyl-1,3-butanediol phosphoryl monochloride
2-pentyl-1,3-butanediol phosphoryl monochloride
2-n-hexyl-1,3-butanediol phosphoryl monochloride
2-(2-methylpentyl)-1,3-butanediol phosphoryl monochloride
1,3-pentanediol phosphoryl monochloride
2-ethyl-1,3-pentanediol phosphoryl monochloride
2-propyl-1,3-pentanediol phosphoryl monochloride
2-butyl-1,3-pentanediol phosphoryl monochloride
2-isobutyl-1,3-pentanediol phosphoryl monochloride
2-pentyl-1,3-pentanediol phosphoryl monochloride
2-butyl-1,3-hexanediol phosphoryl monochloride
2-isoamyl-1,3-hexanediol phosphoryl monochloride
2-n-hexyl-1,3-hexanediol phosphoryl monochloride
1,3-heptanediol phosphoryl monochloride
2-ethyl-1,3-heptanediol phosphoryl monochloride
2-isopropyl-1,3-heptanediol phosphoryl monochloride
2-propyl-1,3-heptanediol phosphoryl monochloride
2-butyl-1,3-heptanediol phosphoryl monochloride
2-pentyl-1,3-heptanediol phosphoryl monochloride
1,3-octanediol phosphoryl monochloride
2-methyl-1,3-octanediol phosphoryl monochloride
2-ethyl-1,3-octanediol phosphoryl monochloride
2-isopropyl-1,3-octanediol phosphoryl monochloride
2-isobutyl-1,3-octanediol phosphoryl monochloride
2-pentyl-1,3-octanediol phosphoryl monochloride
1,3-nonanediol phosphoryl monochloride
2-methyl-1,3-nonanediol phosphoryl monochloride
2-ethyl-1,3-nonanediol phosphoryl monochloride
2-propyl-1,3-nonanediol phosphoryl monochloride
2-butyl-1,3-nonanediol phosphoryl monochloride
2-pentyl-1,3-nonanediol phosphoryl monochloride
2-hexyl-1,3-nonanediol phosphoryl monochloride
4-methyl-1,3-pentanediol phosphoryl monochloride
2-methyl-4-methyl-1,3-pentanediol phosphoryl monochloride
2-butyl-4-methyl-1,3-pentanediol phosphoryl monochloride
4-methyl-1,3-hexanediol phosphoryl monochloride
2-methyl-4-ethyl-1,3-hexanediol phosphoryl monochloride
2-propyl-4,5-dimethyl-1,3-hexanediol phosphoryl monochloride
2-pentyl-4-ethyl-5-methyl-1,3-hexanediol phosphoryl monochloride 5-ethyl-1,3-heptanediol phosphoryl monochloride
2-ethyl-4,5-dimethyl-1,3-heptanediol phosphoryl monochloride
2-butyl-4-ethyl-1,3-heptanediol phosphoryl monochloride
2,4,5-trimethyl-1,3-heptanediol phosphoryl monochloride
6-methyl-1,3-heptanediol phosphoryl monochloride
6-methyl-1,3-octanediol phosphoryl monochloride
2-propyl - 4 - methyl - 1,3 - octanediol phosphoryl monochloride
1,4-pentanediol phosphoryl monochloride
3-methyl-1,4-hexanediol phosphoryl monochloride
2-ethyl - 5 - methyl - 1,4 - heptanediol phosphoryl monochloride
1,5-heptanediol phosphoryl monochloride
2-methyl-1,5-heptanediol phosphoryl monochloride
3-isopropyl - 1,5 - heptanediol phosphoryl monochloride
3 - butyl - 6 - methyl-1,5-heptanediol phosphoryl monochloride The procedure set forth in the preceding examples for the preparation of the novel compounds of this invention is subject to substantial variation. For example, while approximately equimolecular proportions of the reactants are preferred, a slight excess of either material may be utilized. Since the reaction between the alkanediol and phosphorus oxychloride is essentially a quantitative reaction, the utilization of approximately equimolecular proportions of the reactants results in the formation of such a substantially pure alkanediol phosphoryl monochloride that further purification is usually unnecessary. The temperature maintained during the reaction may also be varied over a substantial range, although low temperatures are preferred. Preferably, the temperature of the reaction mixture is maintained in the range of from about 0° C. to about 25° C. Temperatures as high as 50° C. may, however, be utilized and are particularly advantageous towards the end of the reaction to facilitate the removal of the hydrogen chloride formed. The hydrogen chloride formed during the reaction may be removed by any method well known to those skilled in the art, such as, by blowing the mixture with air or by placing the reaction mixture under reduced pressure, the latter method being preferable.

In order to obtain the best possible yield and the highest degree of purity of the alkanediol phosphoryl monochloride, the reaction may be forced to completion by removing the hydrogen chloride formed, such as by placing the reaction system under reduced pressure, until the reaction mixture analyzes essentially 1 gram-atom chlorine for each mol of phosphorus oxychloride charged. In many instances, when the alkanediol phosphoryl monochloride is to be utilized for the preparation of other organic compounds, it is not necessary that the last traces of the hydrogen chloride formed in the reaction be removed. Thus, for example, when the alkanediol phosphoryl monochloride is to be utilized for the preparation of a neutral phosphate ester, it has been found that when the reaction product analyzes about 1.1 gram-atoms of chlorine for every mol of phosphorus oxychloride charged, the mass is of sufficient purity for use in the preparation of the neutral phosphate esters.

What is claimed is:
1. As new chemical compounds, alkanediol phosphoryl monochlorides having the formula

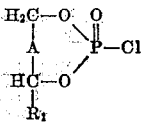

wherein A represents a divalent aliphatic organic radical having the general formula $$C_nH_{2n}$$

wherein $n$ represents a whole number from 1 to 7 inclusive and $R_1$ represents an alkyl radical containing from 1 to 6 carbon atoms.

2. As new chemical compounds, alkanediol phosphoryl monochlorides having the formula

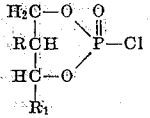

wherein R is selected from the group consisting of hydrogen and alkyl radicals containing from 1 to 6 carbon atoms and $R_1$ represents an alkyl radical containing from 1 to 6 carbon atoms.

3. 2-ethyl-1,3-hexanediol phosphoryl monochloride.
4. 2-methyl-1,3-hexanediol phosphoryl monochloride.
5. 1,3-hexanediol phosphoryl monochloride.
6. 1,3-butanediol phosphoryl monochloride.
7. 2-methyl-1,3-butanediol phosphoryl monochloride.

8. A process for preparing alkanediol phosphoryl monochlorides having the formula

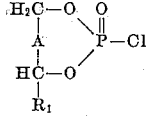

wherein A represents a divalent aliphatic organic radical having the formula $$C_nH_{2n}$$

wherein $n$ represents a whole number from 1 to 7 inclusive and $R_1$ represents an alkyl radical containing from 1 to 6 carbon atoms, which comprises reacting a one molecular proportion of an alkanediol having the formula

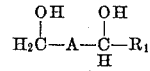

wherein A represents a divalent aliphatic organic radical having the formula $$C_nH_{2n}$$

wherein $n$ represents a whole number from 1 to 7 inclusive and $R_1$ represents an alkyl radical containing from 1 to 6 carbon atoms, with approximately a one molecular proportion of phosphorus oxychloride.

9. A process for the preparation of alkanediol phosphoryl monochlorides having the formula

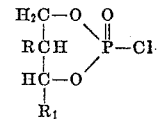

wherein R is selected from the group consisting of hydrogen and alkyl radicals containing from 1 to 6 carbon atoms and $R_1$ represents an alkyl radical containing from 1 to 6 carbon atoms, which comprises reacting a one molecular proportion of an alkanediol having the formula

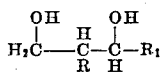

wherein R is selected from the group consisting of hydrogen and alkyl radicals containing from 1 to 6 carbon atoms and $R_1$ is an alkyl radical containing from 1 to 6 carbon atoms, with approximately a one molecular proportion of phosphorus oxychloride.

10. The process as described in claim 9 wherein the alkanediol is 2-ethyl-1,3-hexanediol.

11. The process as described in claim 9 wherein the alkanediol is 2-methyl-1,3-hexanediol.

12. The process as described in claim 9 wherein the alkanediol is 1,3-hexanediol.

13. The process as described in claim 9 wherein the alkanediol is 1,3-butanediol.

14. The process as described in claim 9 wherein the alkanediol is 2-methyl-1,3-butanediol.

15. A process for the preparation of alkanediol phosphoryl monochlorides having the formula

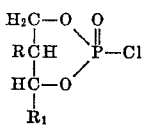

wherein R is selected from the group consisting of hydrogen and alkyl radicals containing at least 1 and not more than 6 carbon atoms and $R_1$ represents an alkyl radical containing from 1 to 6 carbon atoms, which comprises reacting approximately a 1 molecular proportion of an alkanediol having the formula

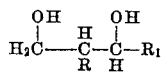

wherein R is selected from the group consisting of hydrogen and alkyl radicals containing from 1 to 6 carbon atoms and $R_1$ is an alkyl radical containing from 1 to 6 carbon atoms, with approximately a 1 molecular proportion of phosphorus oxychloride, while maintaining a temperature in the range of from about 0° C. to about 50° C., and while removing the hydrogen chloride formed.

16. The process as described in claim 15 wherein the alkanediol is 2-ethyl-1,3-hexanediol.

17. The process as described in claim 15 wherein the alkanediol is 2-methyl-1,3-hexanediol.

18. The process as described in claim 15 wherein the alkanediol is 1,3-hexanediol.

19. The process as described in claim 15 wherein the alkanediol is 1,3-butanediol.

20. The process as described in claim 15 wherein the alkanediol is 2-methyl-1,3-butanediol.

HARRY R. GAMRATH.
ROGER E. HATTON.

References Cited in the file of this patent

UNITED STATES PATENTS

| Number | Name | Date |
|---|---|---|
| 2,382,622 | Toy | Aug. 14, 1945 |

OTHER REFERENCES

Wicholhaus, Annalen der Chem. und Pharmacie, Supp. vol. 6, pages 262–264 (1868).

Gerrard, J. Chem. Soc. (London), (1945), vol. 148, page 106.

Arbuzov et al., Bull. acad. sci., U. S. S. R., class sci. chim. (1948), pages 208–218, as abstracted in Chem. Abstr., vol. 42, columns 4932–4934 (1948).